United States Patent Office 3,426,002
Patented Feb. 4, 1969

3,426,002
ORGANO - TIN POLYMERS AND COPOLYMERS PREPARED BY INTERFACIAL CONDENSATION
Max Frankel and David Gertner, Jerusalem, Daniel Wagner, Tel-Aviv, and Albert Zilkha, Jerusalem, Israel, assignors to Yissum Research Development Company, Jerusalem, Israel, a company of Israel
No Drawing. Filed May 12, 1965, Ser. No. 455,306
Claims priority, application Israel, Mar. 22, 1965, 23,197
U.S. Cl. 260—78.4      4 Claims
Int. Cl. C08g 17/00

ABSTRACT OF THE DISCLOSURE

Poly-organo-tin esters, insoluble in organic solvents, are obtained by the interfacial reaction of a salt of an acidic compound having at least two carboxyl groups, such salt being in an aqueous solution, with an organic-tin compound of the general formula $R_1R_2SnX_1X_2$ where X is a halogen atom, the organo-tin compound being dissolved in a water-immiscible organic solvent.

---

This invention relates to a process for the preparation of organo tin polymers and copolymers which comprises reacting a salt of an acidic compound having at least two similar or different acidic groups such as carboxyl, sulfhydryl, sulfonic acid, amide, primary and secondary sulfonamide, heterocyclic radicals containing an acidic hydrogen atom, which salt is dissolved in water, with an organotin compound of the generic formula $R_1R_2SnX_1X_2$ where $R_1$ and $R_2$ are similar or different substituted or unsubstituted alkyl, aryl, aralkyl or heterocyclic groups and $X_1$, $X_2$ are halogen atoms or anions derived from acids having $pK_a$ not higher than 4.8, which later is dissolved in organic solvents insoluble in water. The invention relates also to the novel products thus obtained.

Polymers containing organotin groups are known. For example, a polymer of p-vinyl trialkyltin benzoate was prepared and was found to have fungicidal properties (C.A. 61, 8340 (1964)). Polytrialkyltin acrylates were also prepared (M. F. Shostakovakii, Vysokomol. Soedin., 3, 1128 (1960); D. A. Kochkin et al., C.A. 54, 5150g (1960) Vysokomol. Soedin I, 482 (1959).

Polyorgano stannanes of the formula

were prepared by reaction of dialkyltin dichlorides with sodium (S. M. Zhivokhin, E. D., Dudikova and A. M. Kotov, Zh. Obsch. Khim. 33, 3274 (1963)). Polymers were also obtained by the addition of dialkyl or diaryl tin hydrides to diacetylenes (Netherlands Patent, 25390).

The organotin polymers prepared according to this invention contain the tin atom in the polymer backbone and have the following generic formula:

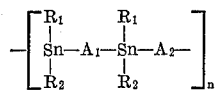

where $A_1$ and $A_2$, which may be identical or different, is the polyacidic radical as defined above and $R_1$ and $R_2$ are unsubstituted or substituted alkyl, aryl, aralkyl or heterocyclic groups.

In this connection it may be mentioned that the reaction of some dicarboxylic acids with dibutyltin diacetate and dibutyltin oxide was investigated (T. M. Andrews, F A. Bower, B. R. Laliberte and J. C. Montermoso, J. Am. Chem. Soc. 80 4102 (1958). On heating, for example, adipic acid with dibutyltin diacetate in xylene at 130° C., a cyclic trimer of dibutyltin-adipate was obtained, melting at 136–137° C. and having a molecular weight of 1205. In a similar reaction with succinic anhydride and dibutyltin oxide a cyclic tetramer having a melting point at 187° C. and a molecular weight of 1430 was obtained.

In the present invention higher polymers can be obtained. For example, with adipic acid a polymer having a melting point of above 200° C is obtained while with succinic acid a polymer having a melting point of above 230° C. is obtained. These poly organotin esters are insoluble in organic solvents, indicating, in addition to their high melting points, that they are different from those obtained by Andrews et al.

According to the present invention the salt of the poly-acidic compound is prepared in water, a solution of the organotin compound, as specified above in an organic solvent, which is immiscible with water, is added, and the reaction mixture is stirred. The polymer usually starts to form immediately and precipitates out, provided that it is insoluble in the reaction mixture. The preparation is easy and gives generally good yields.

The polyacidic compounds are used in the form of either a metal, ammonium or amine salt.

From the theoretical standpoint, it seems possible that the reaction between the $R_2SnX_2$ and the salts of the diacidic compounds, is that of an interchange between the X-anion groups and the acidic anions. Thus for example, if X is chlorine and the acidic anion is a carboxylate anion, the chlorine which is the anion of a stronger acid (HCl) then the carboxylic acid, will exchange the carboxylate group, the same as sulfuric acid can evolve HCl from NaCl. This means that it is required that the X of the $R_2SnX_2$ be a residue of a stronger acid than that of the anion that it is to replace. Thus the reaction between dibutyl tin dichloride and naphthalene 2,6-disodium sulfonate did not lead to the formation of polymer, since the sulfonic acid is stronger than HCl. On the other hand use of $R_2Sn(ClO_4)_2$ is expected to yield a polymer with the disulfonate salt, since perchloric acid is stronger than sulfonic acid.

The volume ratio of the aqueous to the non-aqueous phase is not critical. Ratios, such as 1–10 are suitable.

The organic solvents, which may be used as the non-aqueous phase are many, such as aliphatic or aromatic hydrocarbons, chlorinated hydrocarbons, ethers, etc. This variety of solvents enables the preparation of polymers with varying chain lengths.

The concentration of the reactants in both the aqueous and the non-aqueous phases is not critical. Molar to tenth molar concentrations of the reactants are suitable.

The reaction temperature is also not so critical. Temperatures from 0° C. to around 50° C. may be used.

The polymers encompassed by the present invention include for example, polyorganotin esters. The polycarboxylic acids which may be used according to the present invention have 2–4 carboxyl groups and have the generic formula $R(COOH)_n$ where $n=2-4$ and R is an unsubstituted or substituted alkyl, aryl, aralkyl or heterocyclic group. Examples are: adipic, sebacic, terephthalic, nitroterephthalic, fumaric, itaconic, citric, tartaric, N-acetyl glutamic, acetylene dicarboxylic and ethylene diamine tetra-acetic acids.

Other polymers which can be obtained in accordance with the present invention are poly organotin thioethers prepared from poly thiols having the general formula $R(SH)_n$ where $n=2-4$ and R is as defined above.

Organotin polymers from thio acids such as p-thiolbenzoic acid are also included.

Organotin polymers that can be obtained, include also polymers prepared from primary and secondary sulfonamides having at least two sulfonamide groups in accordance with the general formula $R-(SO_2NHR_1)_2$ where R and $R_1$ are as defined above. These polymers contain Sn-N bonds. Previous work has shown the Sn-N bonds where N is a sulfonamide or imide are stable (Luijten and Van der Kerk, Investigations in the Field of Organotin Chemistry, published by Tin Research Institute, England, 1955). Polyorganotin sulfonic esters are also included in this invention. Examples are polyesters obtained from naphthalene di- or tri-sulfonic acids.

Copolymers may also be obtained according to the present invention by reacting a mixture of salts of diacidic compounds as defined above and/or organotin compounds as specified above. The organotin polymers encompassed in the present invention are new polymeric materials that can have a variety of uses. The fungicidal, bacteriocidal and bacteriostatic properties of organotin esters are well known. Insect and bacteria resistance plastics were obtained by reaction of trialkyltin halides and organic polyesters (Kochkin et al. C. A. 54, 5150 (1960)).

It is expected that the present polymers which contain organotin ester groups in their backbone will have such biological activity.

It is known that the stability of antifungal tin compounds, such as tributyl or triphenyltin acetate is limited owing to hydrolysis. The above polyorganotin esters are more stable, as the tin forms a part of the polymer backbone.

The organotin polymers have also special water repellant properties.

The new polymers and copolymers encompassed in the present invention may also be used as fibers and coatings having antifungal or antibacterial properties.

Specific embodiments of this invention are described in the following examples. These examples are merely illustrative however, and should not be considered as implying any limitations of the scope of this invention.

Example 1.—Polydi-n-butyltin adipate

Adipic acid (1.46 g., 0.01 mole) suspended in 5 ml. water, was neutralized with aqueous 5 N sodium hydroxide and thus brought into solution. N-dibutyltin dichloride (3.03 g., 0.01 mole) in 50 ml. petroleum ether (B.P.40–60°C.) was added with vigorous stirring at 0° C. After 20 minutes, acetone (100 ml.) was added to coagulate the polymer, and the reaction mixture was filtered.

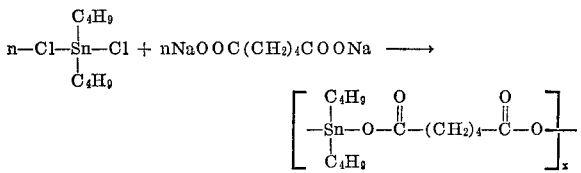

The solid polymer was washed several times with water, ethanol and aceton. Polydibutyltin adipate (3.2 g., 85%), M.P. 220° C. was obtained. It had an intrinsic viscosity of 0.05 in trifluoro ethanol.

Analysis.—Calcd. for $C_{14}H_{26}SnO_4$: C, 44.6; H, 6.9; Sn, 31.5. Found: C, 44.5; H, 6.5; Sn, 32.4.

Similar yields were obtained when the adipic acid was neutralised with an equivalent amount of thiethylamine instead of sodium hydroxide.

Similar results were obtained by using xylene, tetralin, Decalin, chloroform, carbon tetrachloride and methylene chloride as solvent for the dibutyltin dichloride. In the last three solvents, the polymer separated out as a viscous paste, which coagulated readily on addition of acetone.

Example 2.—Poly-di-n-butyltin fumarate

Fumaric acid (1.16 g., 0.01 mole) was suspended in water, as above and neutralised with sodium hydroxide. N-dibutyltin dichloride (3.03 g., 0.01 mole) in petroleum ether (50 ml.) was added with vigorous stirring at 0° C. After 20 minutes the polymer was filtered, yield 3.15 g. (91%). It did not melt below 300° C.

Analysis.— Calcd. for $C_{12}H_{20}SnO_4$: C, 41.5; H, 5.76; Sn, 34.3. Found: C, 41.27; H, 5.78; Sn, 33.15.

Example 3.—Poly-di-n-butyltin-n-carbobenzoxyglutamate

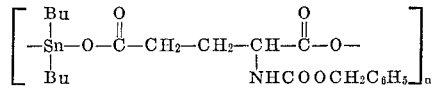

N-carbobenzoxyglutamic acid (1.2 g.) was dissolved in water (5 ml.) and neutralised with 5 N-sodium hydroxide. N-dibutyl dichloride (1.7 g.) dissolved in petroleum ether (50 ml.) was added with stirring at 0° C. After 1 hour acetone was added and the reaction mixture filtered. Polydibutyltin-N-carbobenzoxyglutamate 1.8 g. (82% yield) M.P. 163–5° C. was thus obtained.

Analysis.—Calcd. for: $C_{21}H_{31}NSnO_6$: Sn, 23.2. Found: Sn, 24.3.

Example 4.—Poly-di-n-butyltin terephthalate (Method A)

The polymer was obtained in 70% yield as described in Example 3 from terephthalic acid (1.66 g., 0.01 mole) and di-n-butyltin dichloride (3.03 g., 0.01 mole). The polymer did not melt up to 300° C.

Analysis.—Calcd. for $C_{16}H_{22}SnO_4$: C, 48.4; H, 5.5; Sn, 30.0. Found: C, 48.1; H, 5.7; Sn, 30.4.

Example 5.—Poly-di-n-butyltin acetylenedicarboxylate

Acetylene dicarboxylic acid mono potassium salt (1.52 g., 0.01 mole) in 7 ml. water was neutralised with 20% potassium hydroxide. Di-n-butyltin dichloride (3.03 g., 0.01 mole) in 50 ml. petroleum ether (40–60° C.) was added with stirring at 0° C. After 1 hour the reaction mixture was filtered and washed with water, alcohol and acetone. The yield of the polymer, which did not melt up to 300° C was 81%.

Analysis.—Calcd. for $C_{12}H_{18}SnO_4$: C, 41.7; H, 5.2; Sn, 34.4. Found: C, 39.4; H, 5.3; Sn, 33.0.

Example 6.—Poly-di-n-butyltin succinate

Succinic acid (1.08 g., 0.01 mole) was suspended in 50 ml. water, was neutralised with 5 N sodium hydroxide. Di-n-butyltin dichloride (3.03 g., 0.01 mole) in 50 ml. petroleum ether (40–60° C.) was added with vigorous stirring at room temperature. After 20 min. the reaction mixture was filtered and the solid polymer was washed with alcohol, water and acetone. Polydi-n-butyltin succinate (2.7 g., 78%) M.P. 235° C. was obtained.

Example 7.—Poly-di-isobutyltin adipate

Adipic acid (1.46 g., 0.01 mole) was reacted with di-isobutyltin dichloride (3.03 g., 0.01 mole) as described in Example 1. A yield of 85% of polydiisobutyltin adipate, M.P. about 210° C., was obtained.

Example 8.—Poly-di-n-butyltin terephthalate (Method B)

Di-n-butyltin dichloride (4.5 g., 0.015 mole) in a mixture of 50 ml. toluene and 50 ml. petroleum ether was stirred with a solution of 2 g. (0.03 mole) of sodium formate in 10 ml. water. After 30 min. the organic layer was separated and added with stirring to a solution of disodium terephthalate (prepared from 1.66 g., 0.01 mole terephthalic acid) in 10 ml. water at room temperature. After several hours, the reaction mixture was filtered and the solid polymer was washed with alcohol, water and acetone. Poly-di-n-butyltin terephthalate (3.7 g., 93%) which did not melt up to 300° C. was obtained.

The preliminary reaction of the di-n-butyltin dichloride with sodium formate was to replace the chlorine by formate residue. Thus the chloride concentration of the aqueous layer separated in the start was formed to be 57% of the theoretical.

Using sodium acetate instead of sodium formate gave by the same procedure as above 3.2 g. (80.5%) of the same polymer.

The concentration of chloride ion in the aqueous layer was 85% of the theoretical, showing that 85% of the chlorine was replaced by acetate groups.

The structure of these polymers was confirmed by infra-red spectroscopy.

Example 9.—Copolymer di-n-butyltin (adipate-terephthalate)

Adipic acid (0.7 g., 0.005 mole) and terephthalic acid (0.8 g., 0.005 mole) suspended in 10 ml. of water, were neutralized with base and reacted with di-n-butytin dichloride as described in Example 1. A yield of 52% of the copolymer di-n-butyltin adipate-terephthalate was obtained. It did not melt up to 300° C. Its structure was confirmed by infra-red spectroscopy.

Example 10.—Poly-di-iso-butyltin-p-sulfamoyl-benzoate p-Sulfamoyl benzoic acid (2 g., 0.01 mole) suspended in 10 ml. of water was neutralised with 2.7 N potassium hydroxide and reacted with a solution of di-isobutyltin dichloride (3.5 g., 0.0116 mole) in 150 ml. petroleum ether at −10° C. After 15 hours the reaction mixture was filtered and the solid polymer was washed with water and petroleum ether. Poly-di-isobutyltin p-sulfamoyl-benzoate (3 g., 69%) melting between 170–180° C. was thus obtained and its structure was confirmed by infra-red spectroscopy.

Example 11.—Poly-di-isobutyltin citrate

Citric acid monohydrate (2.1 g., 0.01 mole) was dissolved in 10 ml. of water and neutralised with 2.7 N potassium hydroxide. Di-isobutyltin dichloride (3.5 g., 0.0116 mole) was added with stirring at room temperature (solvent: petroleum ether 40–60° C.). After 3 hours the reaction mixture was filtered and the solid washed with water, alcohol and acetone. Poly-di-isobutyltin citrate (3.2 g.) which did not melt up to 300° C. was thus obtained.

Example 12.—Poly-di-isobutyltin-p-xylylene-di-thiol p-Xylylene dithiol (16 g., 0.01 mole) were suspended in 20 ml. water and neutralized with 2.7 N KOH under argon. A solution of 2.6 ml. di-isobutyltin dichloride in a mixture of 75 ml. petroleum ether (40–60° C.) and 25 ml. chloroform was added and the reaction mixture was stirred at room temperature overnight. The organic layer was separated and added to 500 ml. alcohol. Poly-di-isobutyltin p-xylylene dithiol precipitated out as a transparent semi-solid. Yield 2.5 g.

Example 13.—Poly-di-n-butyltin 1,4-butanebis-thioglycolate 1,4-butane-bis-thioglycolic acid (2.38 g., 0.01 mole) with 15 ml. water was neutralized with 2.7 N KOH. A solution of di-n-butyltin dichloride (7 g., 0.0115 equiv.) in 50 ml. chloroform was added and the reaction mixture stirred at room temperature for 4 hrs. Polydi-n-butyltin 1,4-butane bis thio-glycolate (3.6 g., 51.5%) was obtained. M.P. 138° C.

Example 14.—Poly-di-n-butyltin-pyromellitimide

A solution of di-n-butyltin dichloride (3.5 g., 0.0115 mole) in 50 ml. petroleum ether (B.P. 90–100°) was added to a solution of pyromellitimide (2.16 g., 0.01 mole) which were neutralized with 2.7 N KOH. The reaction mixture was stirred overnight. Poly-di-n-butyltin pyromellitimide (3.1 g.) precipitated out and filtered.

What is claimed is:

1. A process for the production of polymeric organo-tin esters, insoluble in organic solvents, which comprises reacting a salt of an acidic compound having two to four carboxyl groups, said salt being dissolved in an aqueous medium, with an organo-tin compound of the general formula $R_1R_2SnX_1X_2$, where $X_1$ and $X_2$ are selected from the group consisting of anions derived from acids having a $pK_a$ not higher than 4.8 and $R_1$ and $R_2$ are selected from the group consisting of lower alkyl groups, said organo-tin compound being dissolved in an organic solvent immiscible with said aqueous medium, said reaction taking place at the interface between said aqueous medium and said organic solvent medium.

2. A process for the production of organo-tin co-polymers, as claimed in claim 1, wherein two different organo-tin compounds are used for the reaction.

3. A process as claimed in claim 1, wherein the acidic compound is used in the form of a salt selected from the group consisting of metal, ammonium and amine salts.

4. A process as claimed in claim 1, wherein the acid from which the salt is derived is of the general formula $R(COOH)_n$ wherein $n$ is 2–4 and R designates a group selected from the group consisting of unsubstituted and substituted alkyl, aryl, aralkyl and heterocyclic groups.

References Cited

UNITED STATES PATENTS

| | | | |
|---|---|---|---|
| 2,972,595 | 2/1961 | Bavley et al. | 260—45.75 |
| 3,027,350 | 3/1962 | Mack et al. | 260—45.75 |
| 3,184,430 | 5/1965 | Wilson | 260—47 |
| 3,293,273 | 12/1966 | Gloskey | 260—429.7 |

OTHER REFERENCES

Szmant, H., Organic Chemistry, pp. 198–9, Prentice-Hall (1957).

Chem. Abstracts, Korshak, 14112 g, h, 58 (1964).

Morgan, P. W.: Condensation Polymerization: Polymers by Interfacial and Solution Methods, Interscience Publishers, New York, 1965, pp. 7 and 8.

Andrews, T. M., et al.: J. Am. Chem. Soc., 80, 4102–3 (1958).

JOSEPH L. SHOFER, Primary Examiner.

C. A. HENDERSON, JR., Assistant Examiner.

U.S. Cl. X.R.

260—45.75, 429.7; 117—161